(12) United States Patent
Puckett et al.

(10) Patent No.: US 7,740,216 B1
(45) Date of Patent: Jun. 22, 2010

(54) SUSPENSION SYSTEM FOR A BIRD FEEDER

(75) Inventors: Betsy P. Puckett, Foster, RI (US); Paul Artigues, Oneco, CT (US)

(73) Assignee: Droll Yankees, Inc., Foster, RI (US)

( * ) Notice: Subject to any disclaimer, the term of this patent is extended or adjusted under 35 U.S.C. 154(b) by 142 days.

(21) Appl. No.: 11/732,241

(22) Filed: Apr. 3, 2007

Related U.S. Application Data

(63) Continuation of application No. 10/832,051, filed on Apr. 26, 2004, now Pat. No. 7,252,275.

(51) Int. Cl.
A47G 1/00 (2006.01)
(52) U.S. Cl. ............... 248/230.5; 248/231.61; 248/339; 248/227.3; 269/6; 269/3; 269/95; 269/43
(58) Field of Classification Search ............ 248/226.11, 248/227.3, 228.1, 228.2, 228.5, 230.1, 230.5, 248/231.61, 339, 540, 541; 269/6, 3, 95, 269/43
See application file for complete search history.

(56) References Cited

U.S. PATENT DOCUMENTS

| | | | |
|---|---|---|---|
| 1,279,669 A | * | 9/1918 | Deming .................. 248/541 |
| 1,564,703 A | | 12/1925 | Nichols |
| 1,784,482 A | | 12/1930 | Crawford |
| 1,989,001 A | | 1/1935 | Dittman |
| 2,003,535 A | | 6/1935 | Haskin |
| 2,988,310 A | * | 6/1961 | Wright .................. 248/511 |
| 2,994,501 A | * | 8/1961 | Barnard ................ 248/231.61 |
| 3,139,260 A | | 6/1964 | Hamel |
| 4,526,333 A | | 7/1985 | Nakama et al. |
| 4,904,220 A | * | 2/1990 | Williams et al. ............ 446/227 |
| 5,385,324 A | | 1/1995 | Pryor et al. |
| 5,560,576 A | * | 10/1996 | Cargill .................. 248/231.61 |
| D389,334 S | * | 1/1998 | Attridge .................. D6/418 |
| 5,836,327 A | * | 11/1998 | Davis .................... 135/16 |
| D413,429 S | * | 9/1999 | Carson .................. D3/10 |
| 6,276,651 B1 | | 8/2001 | Dolan |
| 6,360,408 B1 | | 3/2002 | Dykstra et al. |
| D470,400 S | * | 2/2003 | Fraser et al. .............. D8/396 |
| D510,656 S | * | 10/2005 | Brewer .................. D3/5 |

* cited by examiner

*Primary Examiner*—J. Allen Shriver, II
*Assistant Examiner*—Steven M Marsh
(74) *Attorney, Agent, or Firm*—Salter & Michaelson

(57) ABSTRACT

A support system for a bird feeder. The support system allows vertical and circumferential adjustment of the bird feeder, and prevents dislodgement of the bird feeder from the support system.

22 Claims, 14 Drawing Sheets

SUSPENSION SYSTEM FOR A BIRD FEEDER

RELATED CASES

This is a continuation of U.S. patent application Ser. No. 10/832,051 filed on Apr. 26, 2004 now U.S. Pat. No. 7,252,275.

BACKGROUND

1. Technical Field

The present disclosure is directed to a support system for suspending a bird feeder and, in particular, to a support system that prevents the feeder from bouncing off the hanger when the support system or bird feeder are impacted.

2. Related Art

Many types of suspension systems are available for suspending bird feeders, floral arrangements, and other decorative items. The hooks or hangers are supported in a variety of ways. For example, hooks can be supported on a pole that can be inserted into the ground. Pole hangers are simply inserted into the ground, and are desirable because they can be easily moved between locations by removing them from the ground and repositioning the pole in a different location. Others types of support systems may be adapted for mounting onto other support structures such as, for example, deck rails. Still other types of support systems may be mounted directly to an exterior wall. One popular style is known as a "shepherd's hook," which can be pole-, deck- or wall-mounted. Shepherd's hooks include an open loop at the hanging end of the hanger, into which a suspension means such as the bail wire of a bird feeder can be received.

Although easy to use, shepherd's style hooks may be problematic for suspending bird feeders, because when a squirrel or other animal attempts to access the seed in a bird feeder suspended from such a hook, the movement of the squirrel onto or off of the bird feeder causes the bird feeder to bounce. When the bird feeder bounces, the bail wire is frequently dislodged from the open loop of the hook, causing the bird feeder to fall to the ground. This is a serious nuisance problem for bird enthusiasts not only because they must replace the bird feeder, but also because it allows the squirrels to eat the seed, sometimes damaging the bird feeder to do so if the seed is not easily accessible.

In addition, when deck-mounted, the position of the bird feeder is often fixed in a vertical direction, and the position of the arm is typically limited to one or two positions.

U.S. Pat. No. 1,564,703 to Nichols discloses a holder with a clamp at the bottom of a pole with one fixed arm and a second adjustable arm that allows the width of the support arm to which the clamp is attached to be varied. However, Nichols does not allow the vertical position of the clamp to be varied.

U.S. Pat. No. 2,003,535 to Haskins discloses a fishpole holder. The fishpole holder includes a clamp with two folding arms that receive the pole, the opposite ends of which can be adjusted to varying widths of the support onto which the pole is attached. The devices move along the pole so the height of the pole can be varied within the holder and the width of the support can be varied as well.

U.S. Pat. No. 4,526,333 to Nakama et al. discloses a quick release clothing system having a hanger made from a wire with two closed loops at opposing ends. The closed loops would prevent a hanger such as a bird feeder from becoming dislodged when the pole is mounted.

U.S. Pat. No. 6,276,651 to Dolan discloses a mounting device for a flag pole that is adjustable so that the weight and thickness of the reel onto which it is attached can be varied and also so that the vertical height of the pole can be adjusted as well.

There remains a need in the art for a support system for a bird feeder that does not become dislodged when impacted that is adjustable in a vertical direction and rotatable to any position about an axis.

SUMMARY

In one embodiment, the present disclosure is directed to a support system for suspending a bird feeder. The support system includes a first elongated tubular support member having an upper end and a lower end, a retaining device at the upper end of the support member, and a clamping device at the lower end of the support member. The retaining device includes a first, open position and a second, closed position for retaining the suspension member in the retaining means. The clamping member includes an upper clamp member and a lower clamp member, each of the upper and lower clamp members corresponding apertures for receiving the tubular support member therein, and including spaced apart adjustable jaws for adjusting the tension on the tubular member to allow vertical and circumferential movement of the tubular member in the aperture.

The foregoing and other objects, features and advantages of the disclosure will be apparent from the following more particular description of preferred embodiments of the disclosure, as illustrated in the accompanying drawings in which like reference characters refer to the same parts throughout the different views. The drawings are not necessarily to scale, emphasis instead being placed upon illustrating the principles of the disclosure. The principles and features of this disclosure may be employed in varied and numerous embodiments without departing from the scope of the disclosure.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION OF THE PREFERRED EMBODIMENTS

The present disclosure is directed to a support system for suspending items such as, for example, bird feeders, flowers pots, and the like. The present support system is designed to prevent the suspended item from being dislodged from the support system when subjected to a force. The support system also includes a clamping assembly with an adjustable clamp that allows the support system to be mounted on support structures such as, for example, deck rails of varying thicknesses. The support system also allows the height of a suspended item to be adjusted upwardly or downwardly, and it also allows the position of the bird feeder to be varied by 360 degrees about a central axis.

Figure 1:
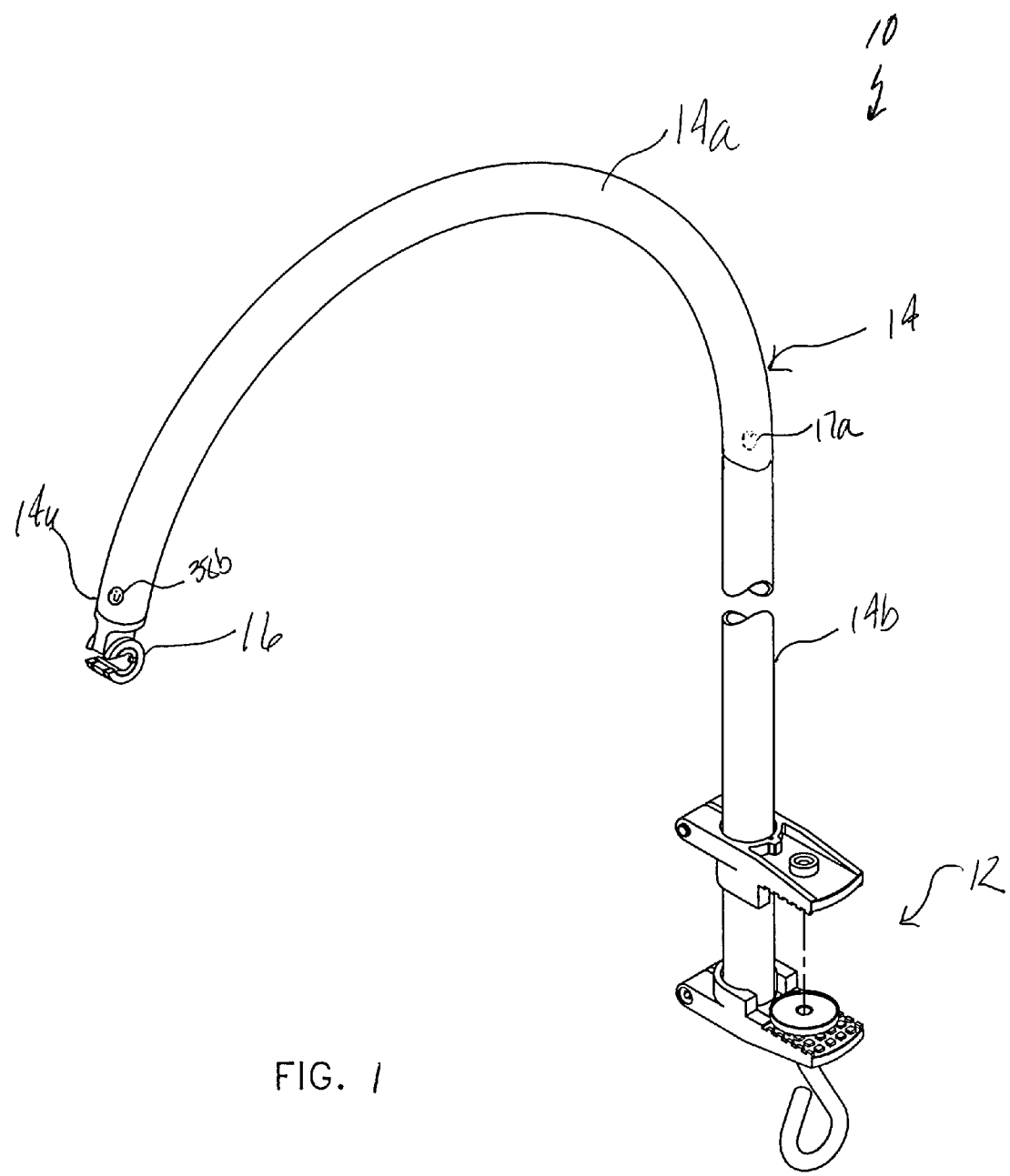
FIG. 1 is a perspective view of the present support system.

Referring now to FIG. 1, the present support system 10 includes a clamping assembly 12, a two-piece support member 14 adapted to be received in clamping assembly 12, and a retaining device 16 adapted to be received in the support member 14. Preferably, support member 14 is hollow or tubular, as in the present embodiment. Preferably, support member 14 includes a lower tubular support member 14b which supports an upper tubular support member 14a, but it also could be a unitary member, if desired.

Upper tubular support member 14a is preferably curved, and includes a detent 38b at a hanging end 14u. Upper support member 14a also includes an inwardly protruding knob 17a (shown in phantom) at a lower end thereof.

Figure 1A:
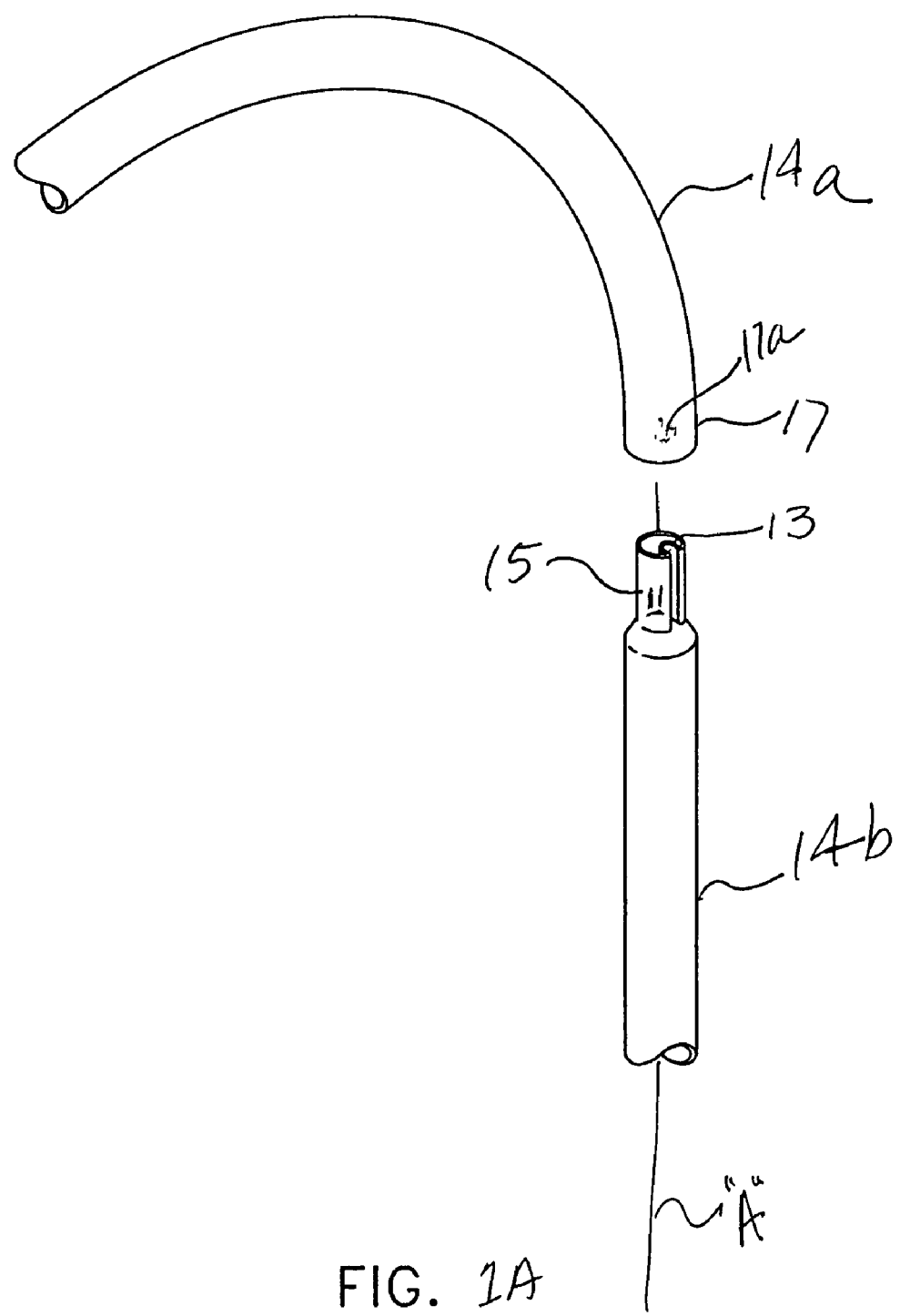
FIG. 1A shows an enlarged view of the connection between the components of the tubular support member.

In the present embodiment, as shown in FIG. 1A, lower tubular support member 14b has a reduced diameter upper extension 15 having a sidewall 11, and defining a channel 13 in the sidewall. Thus, when assembled, knob 17a of upper support member 14a is aligned with channel 13, and lower tubular support member 14b is telescopingly received in the lower end 17 of upper tubular support member 14a. Such an arrangement prevents or minimizes the collection of water from rain or melted snow in the lower tubular support. The engagement of knob 17a with channel 13 keeps the support member 14 from moving freely as a result of, for example, the wind, or the momentum of a squirrel's jump. The 360° feature is controlled by rotating the tubular member 14b within the clamp 12 as shown in FIG. 1.

Suitable materials from which the support member may be formed include steel, plastic, and the like. If desired, some or portions of the components may be coated with a finish such as paint or powder coating to resist corrosion, for decorative purposes, and the like.

Figure 2:
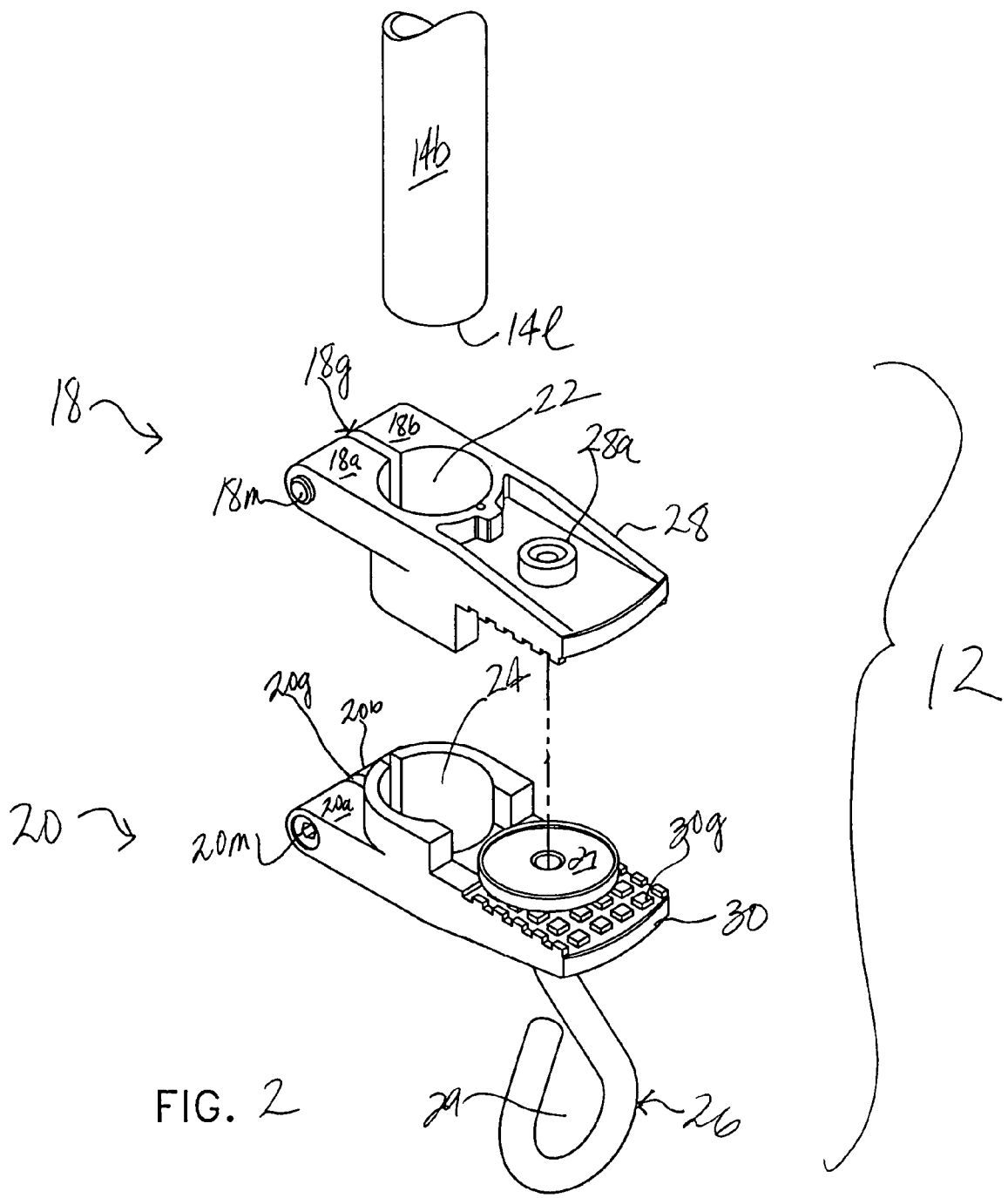
FIG. 2 is an enlarged exploded view of the clamping assembly shown in FIG. 1.
Figure 3:
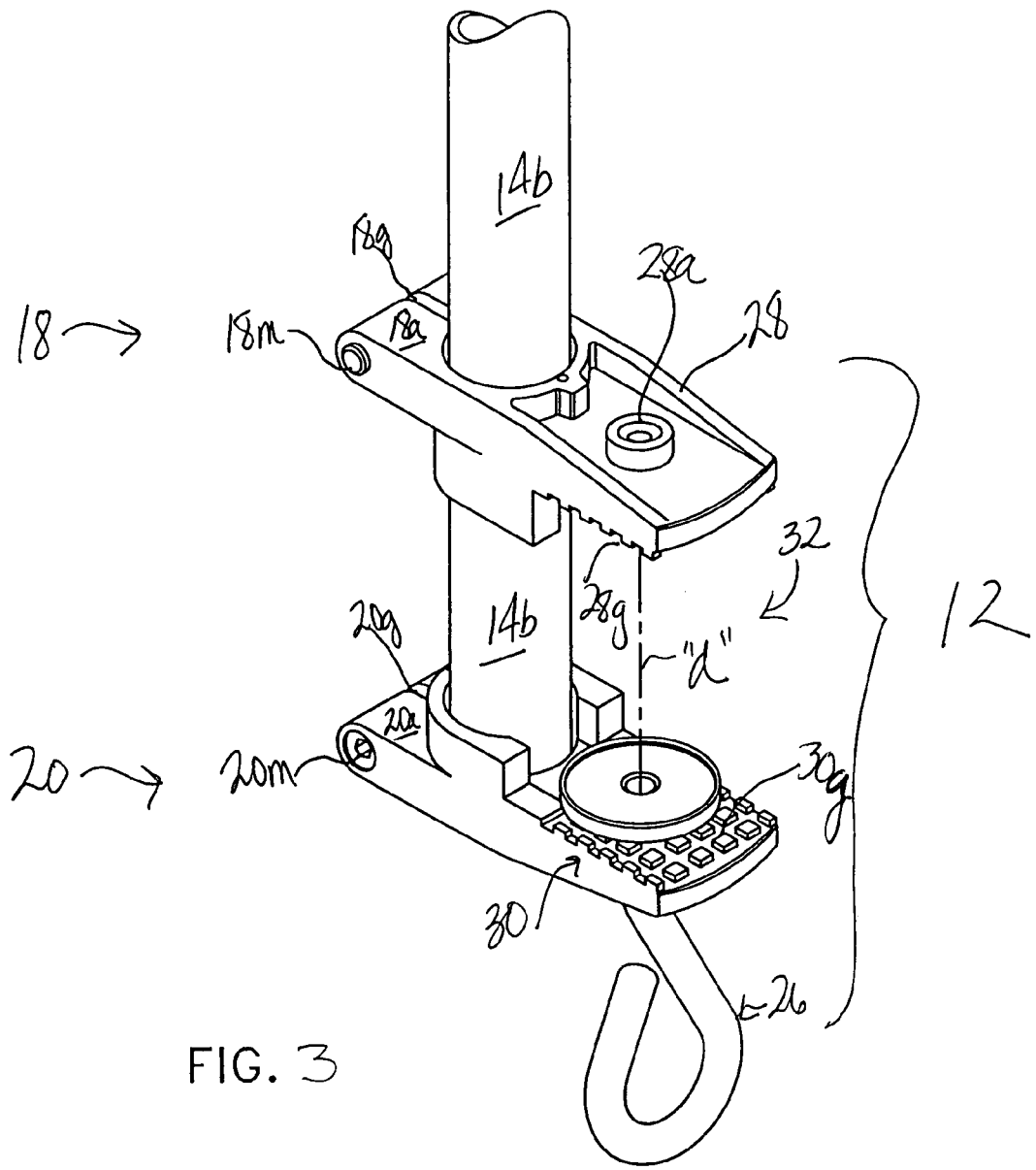
FIG. 3 is an enlarged perspective view of the clamping assembly shown in FIG. 2.
Figure 4:
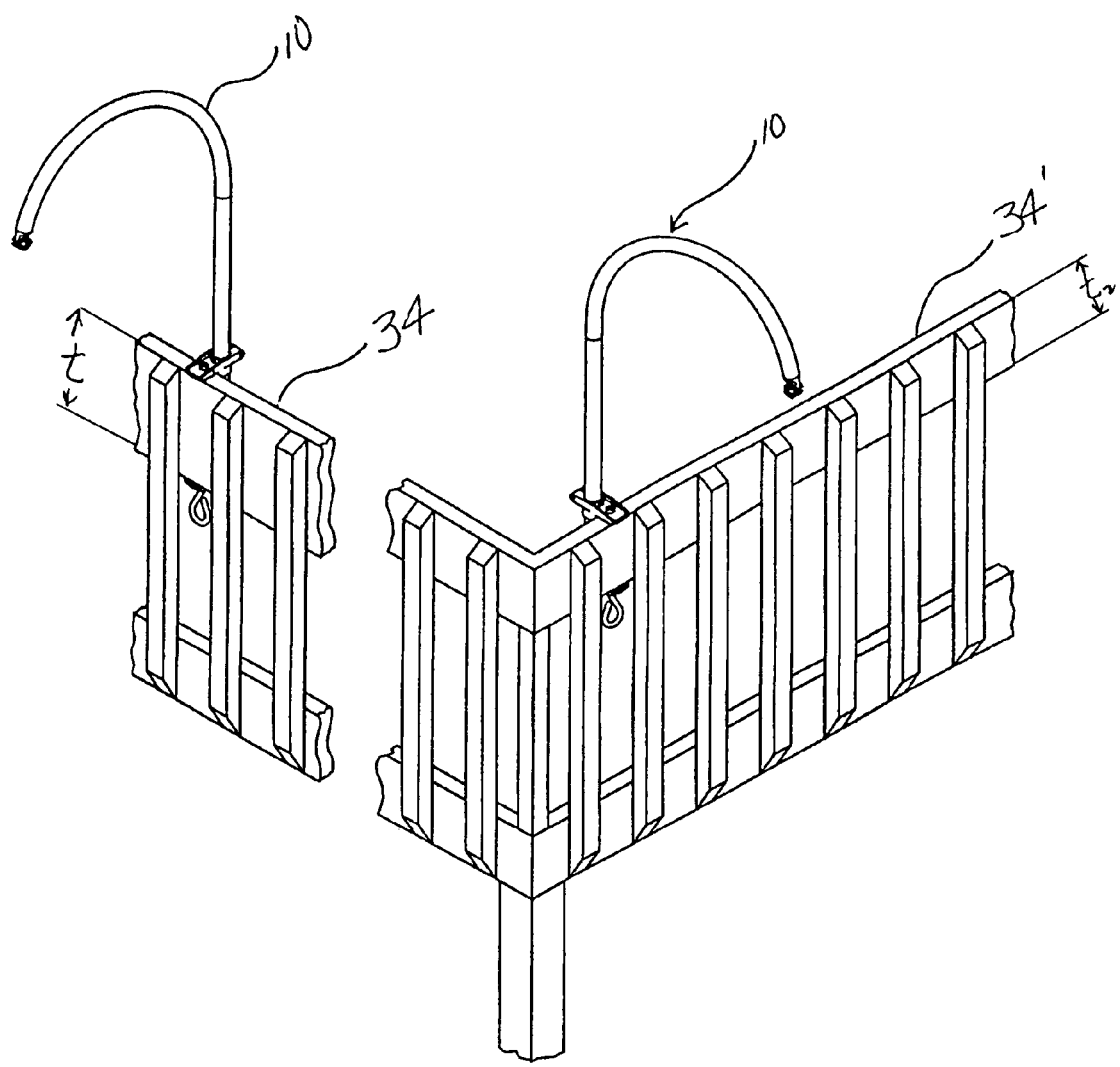
FIG. 4 illustrates two of the present support systems mounted onto two deck rails, each having a different dimension.

FIGS. 2-4 show clamping assembly 12 in more detail. As shown, clamping assembly 12 includes an upper arm 18 and a lower arm 20, each including a corresponding aperture 22,24 sized and dimensioned to receive lower tubular support member 14b therein. Although not illustrated, if desired, one or both of apertures 22, 24 may be lined with vertical splines, which in some instances may increase its grasping effectiveness. Such splines may be formed integrally with the apertures, or added thereto by, for example, gluing, and may be the same material or different than that of the clamps.

Each arm 18,20 includes a first and second set of jaws 18a,b, 20a,b, each set of jaws defining a gap 18g, 20g therebetween. Each of the first and second set of jaws includes a fastening mechanism 18m, 20m for adjusting the gap 18g, 20g between the jaws, and which allows the jaws to be manually tightened or loosened around lower tubular support member 14b, as desired. In the present embodiment, fastening mechanisms 18m, 20m are conventional threaded screw and nut assemblies, but any fastening mechanism may be used, provided it allows adjustment of gaps 18g, 20g between the first and second set of jaws of each arm 18, 20.

Also as shown, clamping arms 18,20 each include gripping extension arms 28,30 adjacent to apertures 22,24 and opposite fastening mechanisms 18m,20m. Gripping extension arms 28,30 each include an inner, gripping surface 28g,30g which in preferred embodiments, is textured as shown. As shown in FIG. 3, when clamping arms 18,20 are positioned on lower tubular support member 14b, together they define a recess 32 having a distance "d" between gripping extension arms 28,30. Recess 32 is adapted to receive, for example, a support member 34 such as a deck rail, on which support system 10 may be supported. By varying the distance between the clamping arms 18,20, it is possible to vary the distance "d" in order to accommodate different thickness of support member 34.

In preferred embodiments, at least one of gripping extension arms 28,30 may include a device 26 for applying further clamping force to support member 34 in order to ensure that clamping device 12 is securely clamped onto the support member 34. As shown, gripping extension arm 30 includes a threaded aperture 30a adapted to receive device 26. In the present embodiment, device 26 is a threaded eye hook 26 with a threaded end 26a opposite the eye 29. To assemble device 26, the threaded end 26a of device 25 is inserted into aperture 30a (as shown) and a removable disc 27 with a central threaded aperture (not illustrated) is screwed onto the threaded end 26a. Alternatively, disc 27 may be unitary or integral with device 26. If desired, gripping extension arm 28 may include an aperture 28a adapted to receive a wood screw (not illustrated), to further secure clamp 12 to the deck rail, should a user feel it is necessary.

Figure 5:
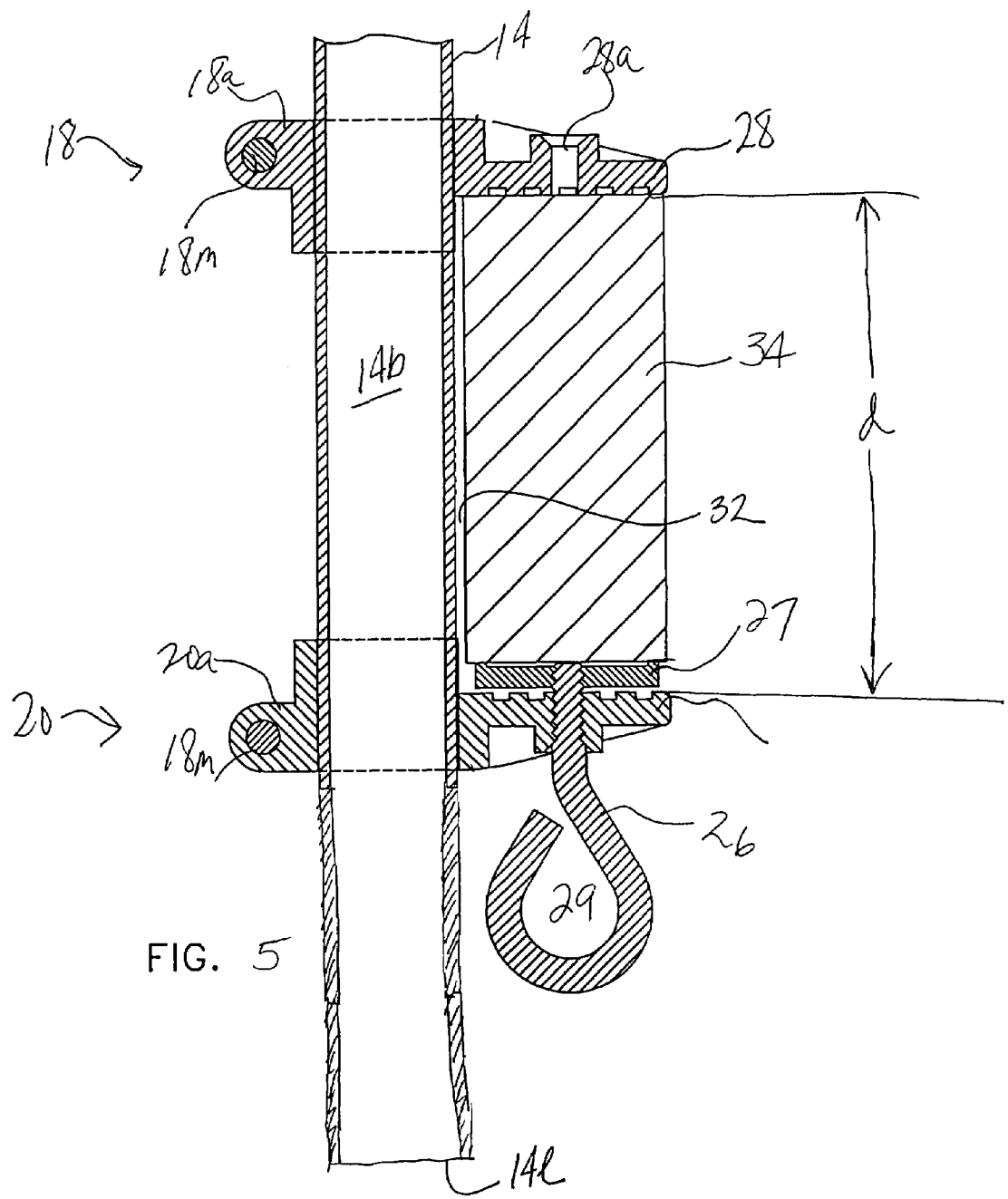
FIG. 5 is an enlarged cross-sectional view of the clamping assembly of the present support system, showing a deck rail received in the clamping assembly.

In operation, the vertical position of tubular support member 14 may be adjusted by manually loosening fastening mechanisms 18m,20m associated with first and second jaws 18a,b and 20a,b, and sliding lower tubular support member 14b vertically or circumferentially to achieve the desired height and orientation of support member 14a, followed by manually tightening fastening mechanisms 18m,20m to secure lower tubular support member 14b in a desired fixed position. Thus, when assembled, lower end 141 of support member 14 may be substantially even with lower arm 20 of clamping member 12, or it may extend below lower arm 20 as shown in FIG. 5, depending on the desired vertical position of lower support member 14b.

Thus, when it is desired to reposition the support system, the first, second, or both arms may be adjusted in order to accommodate varying thicknesses of the rail by which it will be supported.

FIGS. 6-9, when taken together, illustrate retaining device 16 in greater detail. Retaining device 16 may be any device that retains or prevents dislodgement of the bail wire 50 of a bird feeder when the bird feeder or any portion of the support system is subjected to a force such as, for example, the wind, or the momentum of a squirrel's jump. In one exemplary embodiment, retaining device 16 is a barrel hook, which is the type of retaining device illustrated in the figures. Therefore, for ease of illustration, retaining device 16 will be referred to hereinafter as a "barrel hook."

Figure 6:
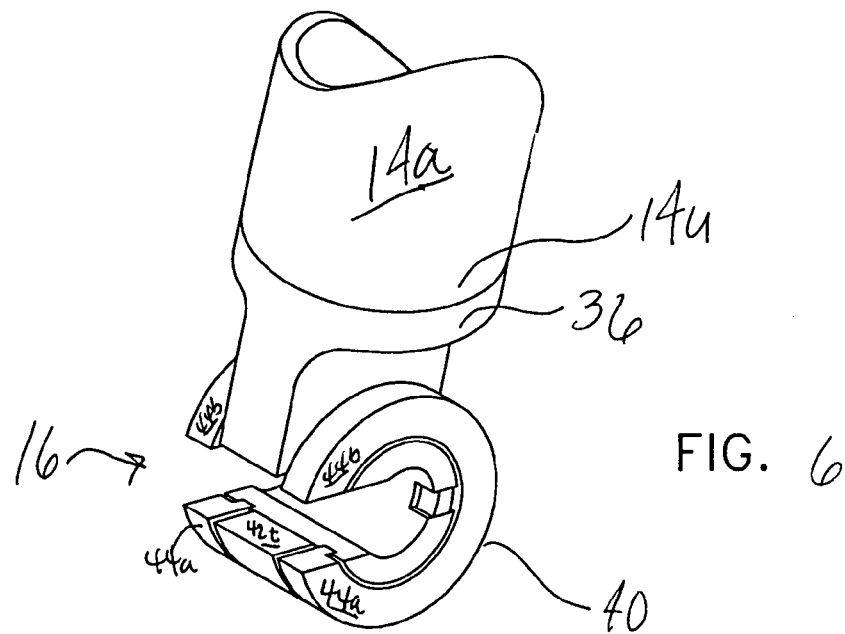
FIG. 6 is an enlarged view of the barrel hook of the present pole system.
Figure 7:
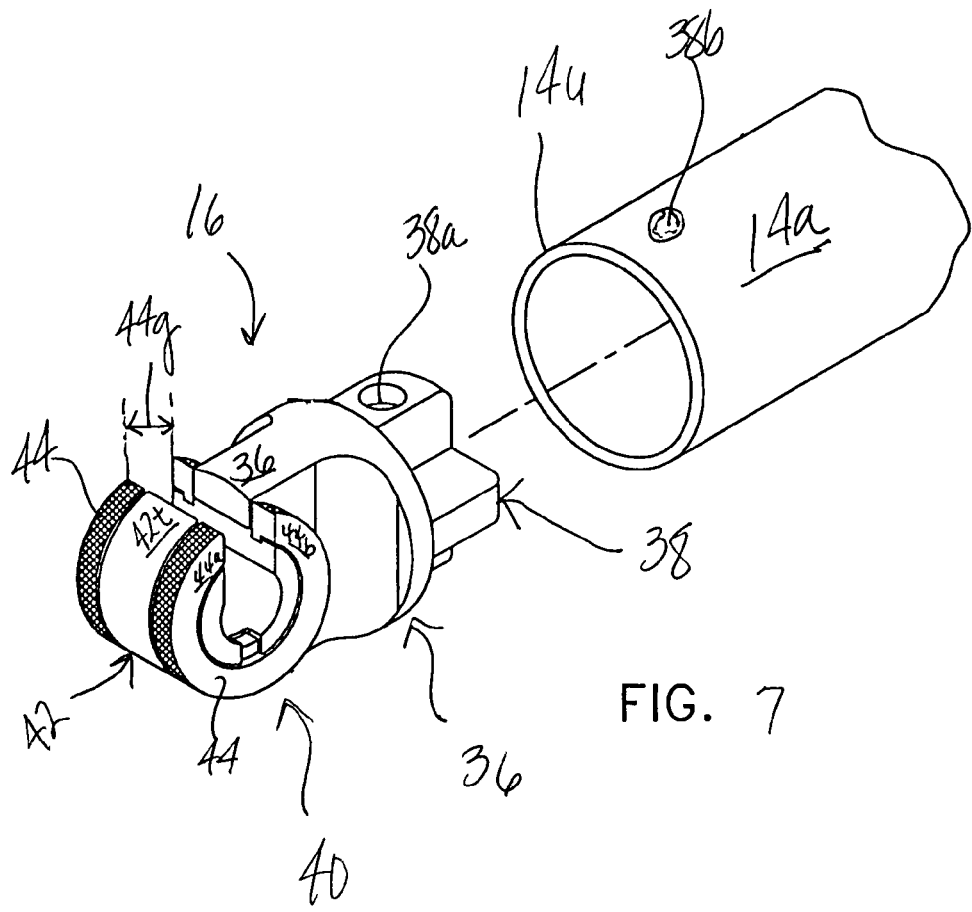
FIG. 7 is an enlarged exploded view of the barrel hook shown in FIG. 6.

Barrel hook 16 includes a base portion 36, a rear extension portion 38, and a hook portion 40 opposite rear extension portion 38. Rear extension section 38 is sized and dimensioned to be received into upper end 14u of upper tubular support member 14, and includes a recess 38a. Thus, when barrel hook 16 is coaxially positioned in tubular support member 14, as shown in FIG. 6, detent 38b snaps into recess 38a of rear extension portion 38, and base 36 rests against the circumference of upper end 14u of upper tubular support member 14a.

Hook 40 is conventional in construction, and includes a stationary hook member 42 and a movable hook member 44. Stationary hook member 42 includes a terminating end 42t defining a first gap 42g between terminating end 42t and base 36 (best seen in FIG. 9). Movable hook member 44 is concentrically mounted in stationary hook member 42 such that it freely rotates within stationary hook member 42. Movable hook member 44 includes two arms 44 with ends 44a,b defining a second gap 44g therebetween (best seen in FIG. 7).

Figure 8:
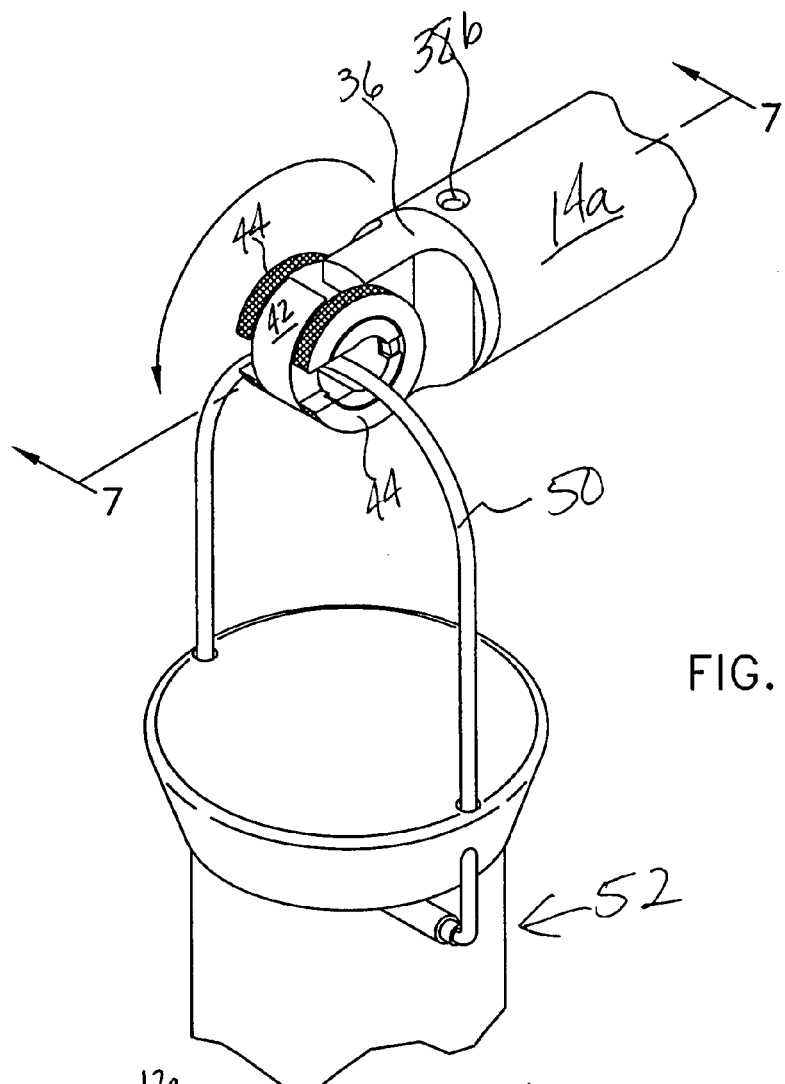
FIG. 8 illustrates the barrel hook with the bail wire of a bird feeder received therein.
Figure 9:
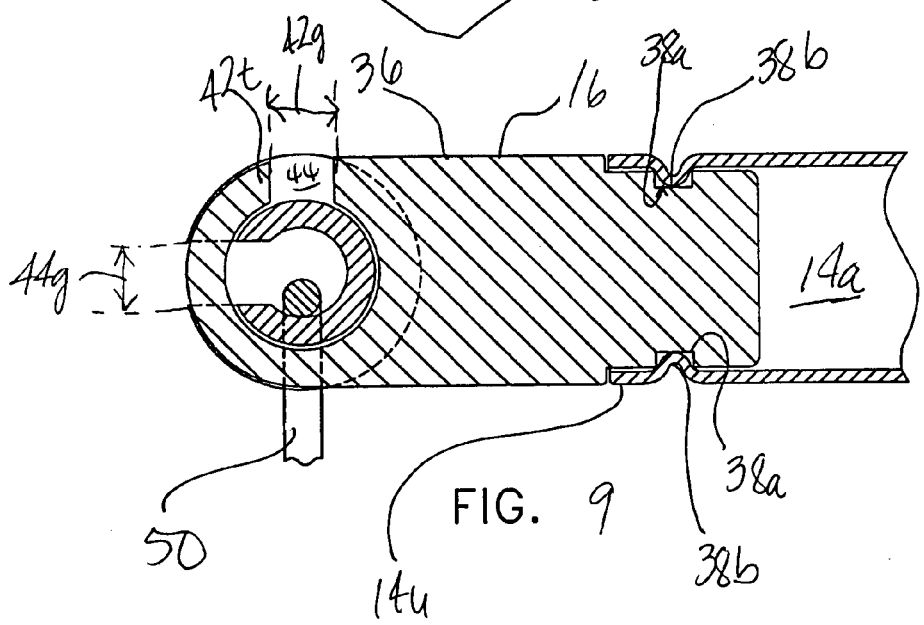
FIG. 9 is a cross-sectional view of the barrel hook shown in FIG. 8, showing the bail wire received in the barrel hook.

The open position of the barrel hook is defined by the alignment of the first and second gaps 42g, 44g (best seen in FIGS. 6-7), and the closed position is defined by the misalignment of the first and second gaps 42g, 44g (best seen in FIGS. 8-9). In operation, movable member 44 is constructed and arranged to be rotatably movable between the first, open position shown in FIGS. 6 and 7, and the second, closed position as shown in FIGS. 8 and 9. In another embodiment, moveable member 44 or a portion thereof may be weighted in order to urge it to remain in a closed position.

FIG. 8 shows the barrel hook in a closed position with the bail wire 50 of a bird feeder 52 received therein, and in which gaps 42g, 44g are misaligned in order to prevent removal of bail wire 50. In this manner, if the bird feeder or any portion of the support system is subjected to a force, as by bumping, the bail wire will not become dislodged.

Figure 10:
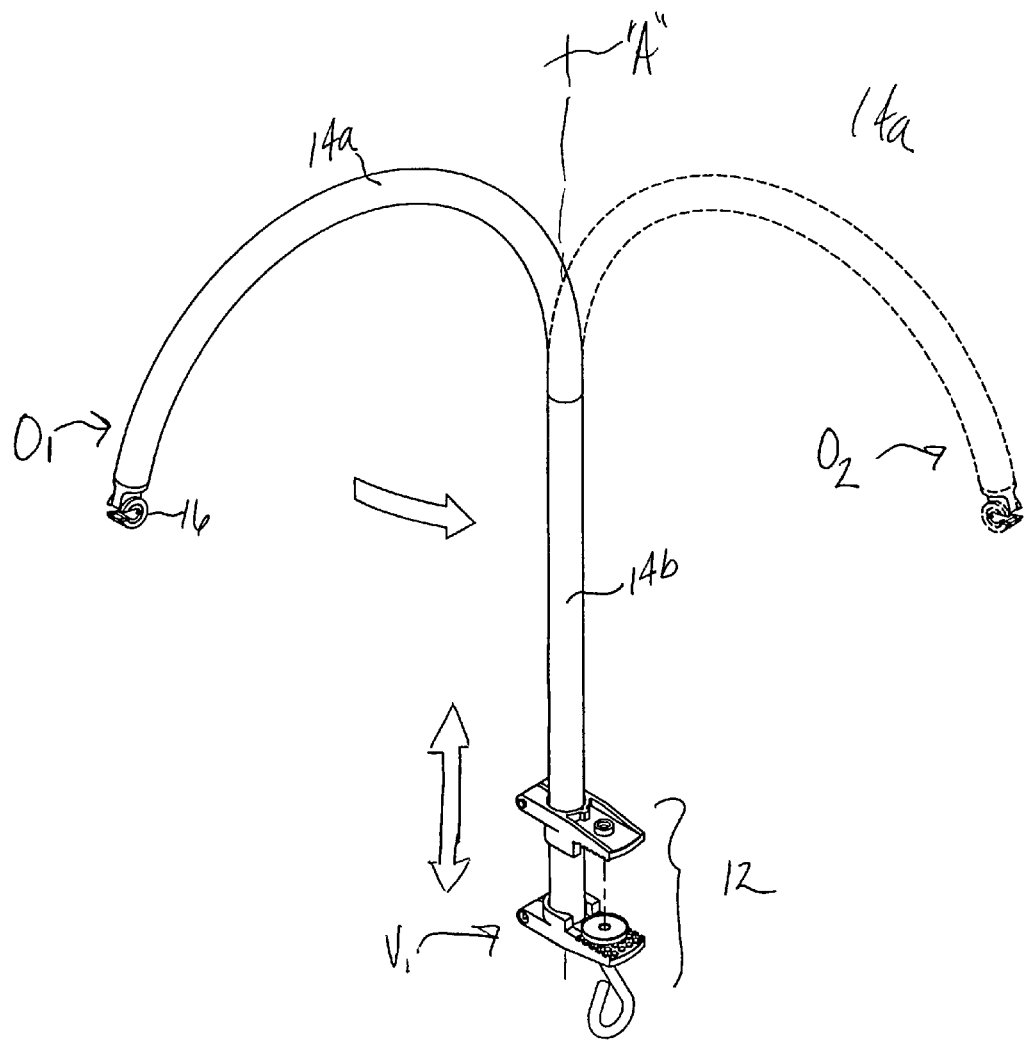
FIG. 10 is a perspective view showing the rotation of the tubular support member about an axis.
Figure 10A:
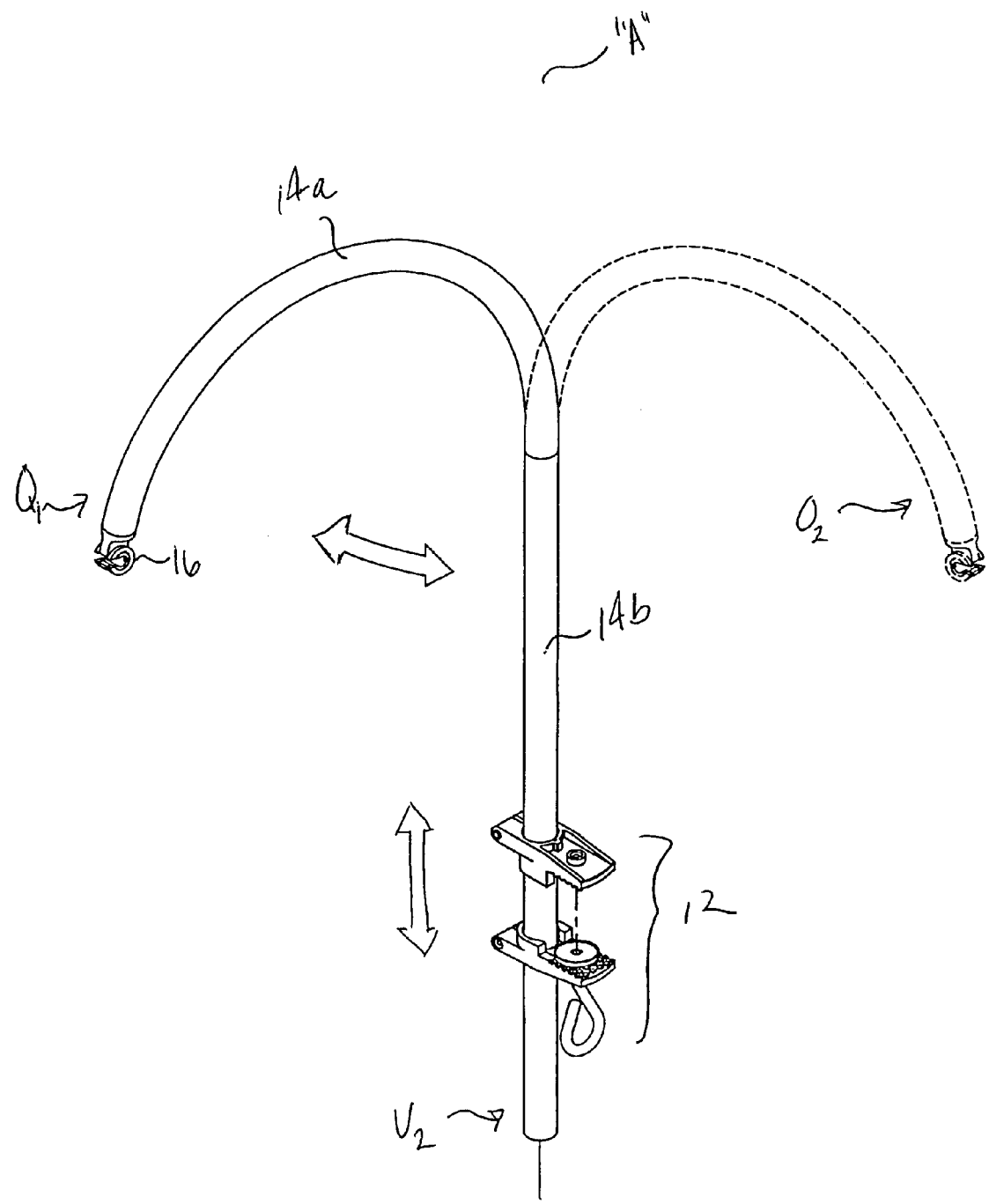

FIG. 10 illustrates two different circumferential orientations "O₁" and "O₂" of upper tubular member that may be achieved using the present system by manually rotating lower tubular member 14b in clamp 12. It should be understood that any other circumferential orientation of upper tubular member 14a may be obtained simply by manually loosening fastening mechanisms 18m, 20m sufficiently to allow rotation of lower tubular support member 14b, and manually tightening fastening mechanisms 18m, 20m once the desired circumferential orientation has been achieved. Similarly, the vertical position of upper tubular member 14a may be adjusted or changed by again manually loosening fastening mechanisms 18m, 20m sufficiently to allow lower tubular support member 14b to be slidably moved upwardly or downwardly within apertures 22, 24 until a desired vertical position is achieved, and then again manually tightening fastening mechanisms 18m, 20m. Of course, it is not necessary to loosen/tighten fastening mechanisms 18m,20m twice if it is desired to change both the vertical position and circumferential orientation, which may be performed at the same time.

Figure 11:
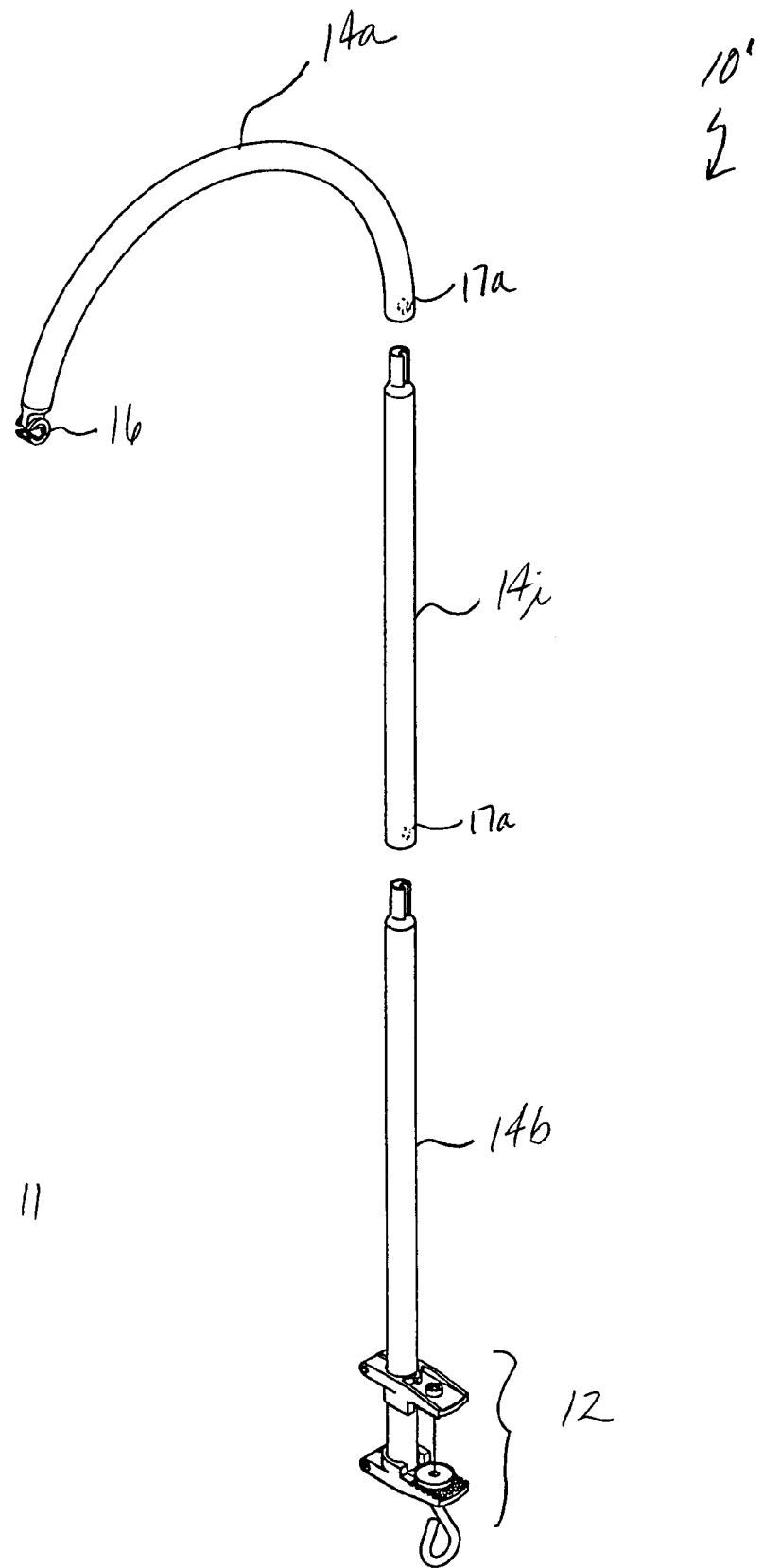
FIG. 11 is another embodiment of the present support system, including an intermediate tubular support member for extending the height of the support system.

In another embodiment shown in FIG. 11, support system 10' includes an intermediate pole piece 14i which extends its height in comparison to support system 10.

Figure 12:
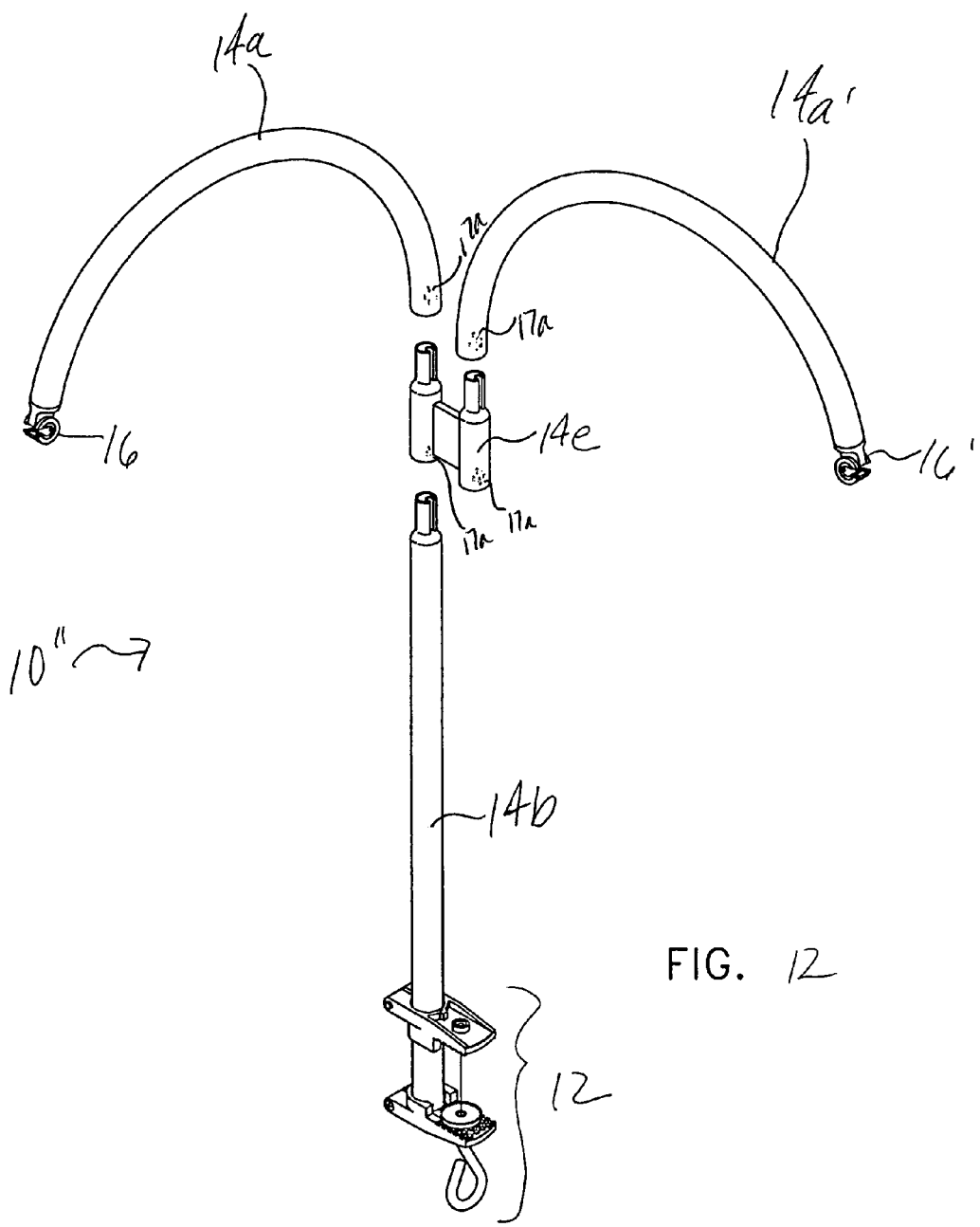
FIG. 12 is another embodiment of the present support system, including an intermediate tubular support member for allowing the suspension of additional items.

In another embodiment shown in FIG. 12, support system 10" includes an intermediate extension arm 14e which provides increased height in comparison to support system 10' and allows a second support member 14a' to be added to the system. The construction of second additional support member 14a' is the same as that of 14a. Extension arm 14e includes at least two support members, one or both of which are preferably tubular or hollow, and if tubular or hollow, includes an inwardly protruding knob 17a which is received into channel 13 of lower support member 14b when assembled.

Figure 13:
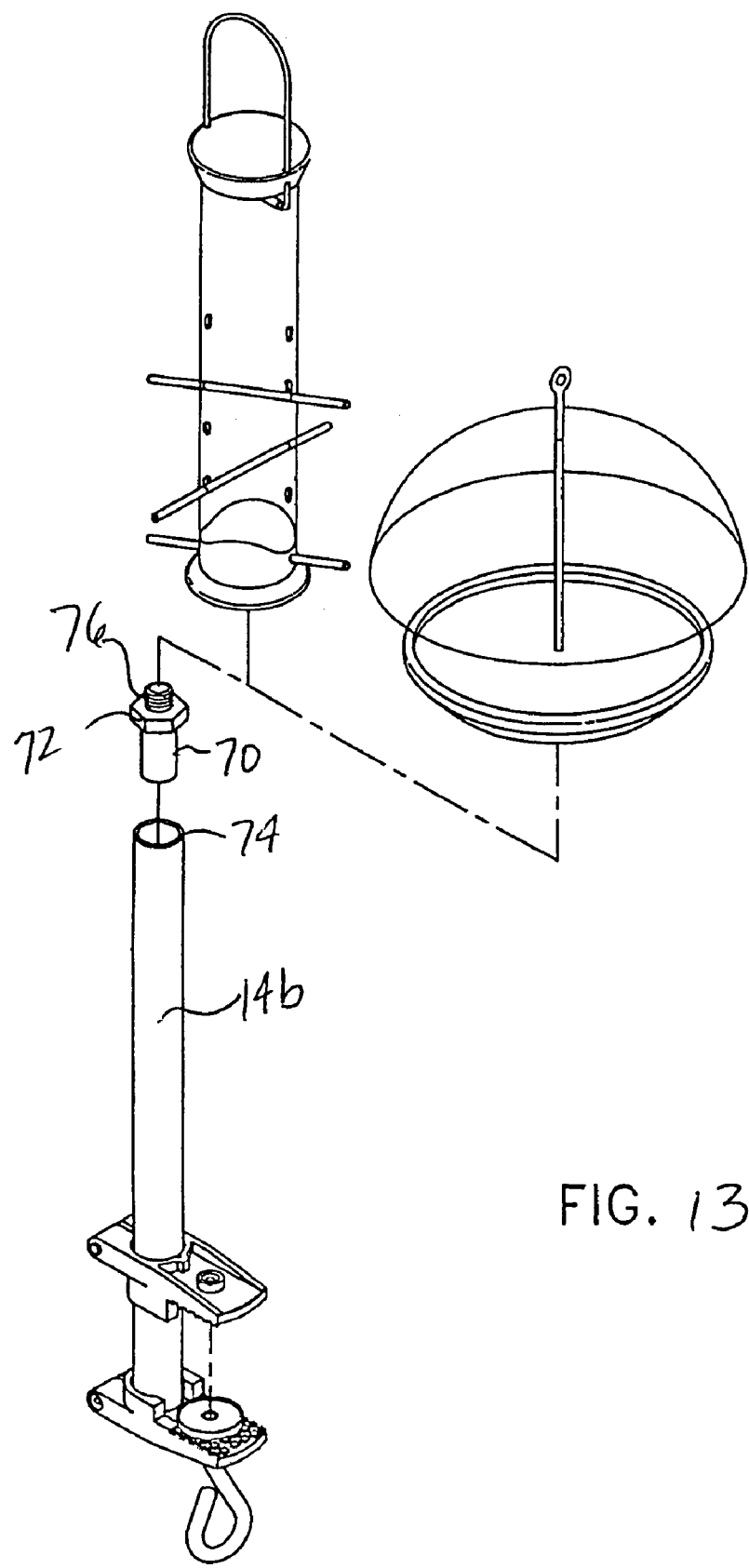
FIG. 13 is another embodiment of the present support system, including an adjustable extension arm for supporting accessory items.

In another exemplary embodiment illustrated in FIG. 13, lower support member 14b preferably includes a hollow upper section which facilitates the engagement of an adaptor 70 that is received into the upper end thereof. Adaptor 70 includes a collar 72 that rests against the upper edge 74 of lower support member 14b, which supports adaptor 70 at the upper end thereof. Extending from the upper surface of the adaptor is an externally threaded stud 76, which may be used to engage a variety of accessories having a corresponding female threaded recess (not illustrated), which may be found on a variety of, for example, tubular or dish feeders. Similarly, although not illustrated, adaptor may include an internally threaded bore to which an externally threaded stud may be engaged to support an accessory item.

Figure 14:
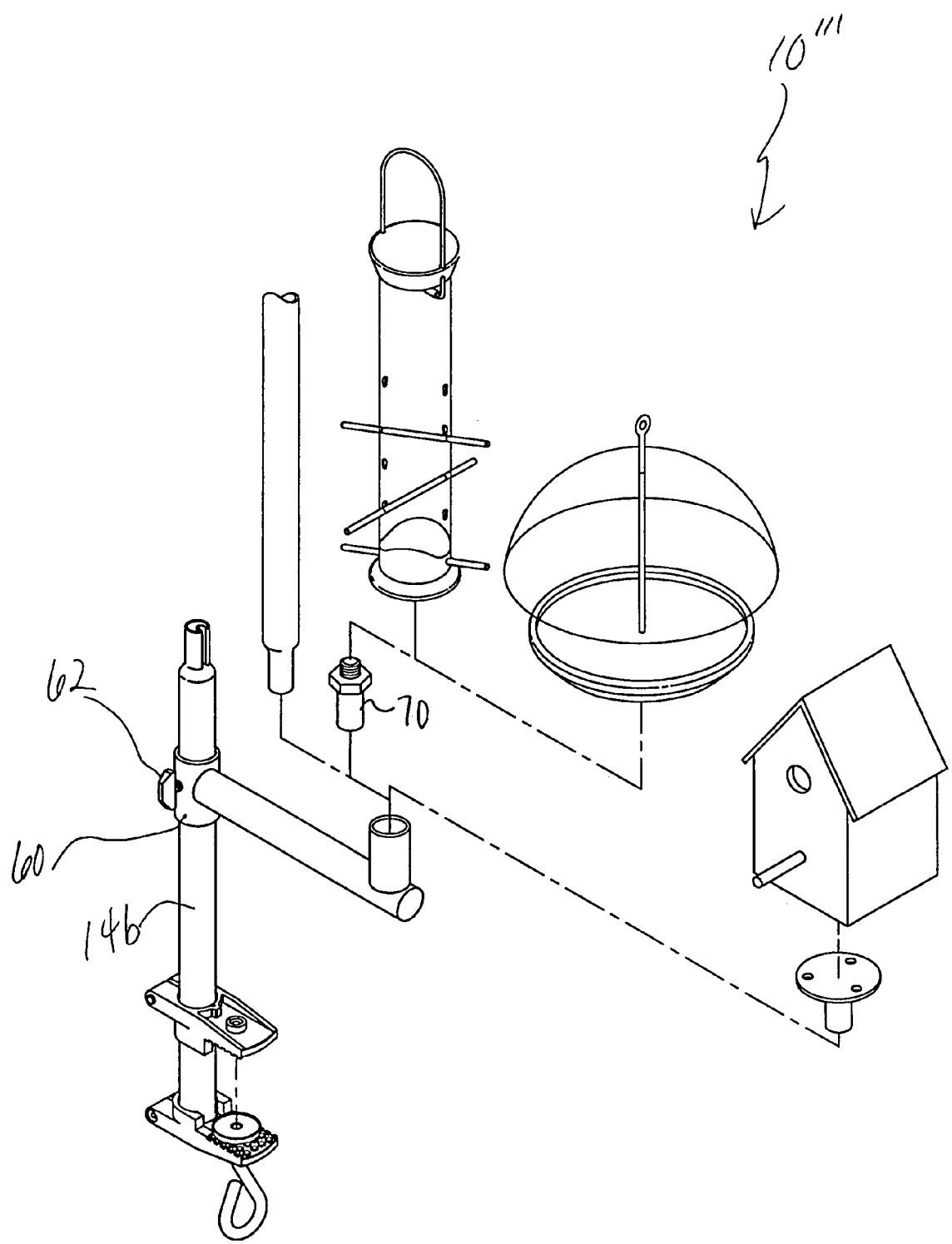
FIG. 14 is another embodiment of the present support system, including an adaptor for supporting additional items.

FIG. 14 shows yet another embodiment of a support system 10''', which includes an extension arm 60 slidably received onto tubular support member 14b. Extension arm 60 is designed to receive a variety of other accessory items such as plants, bird feeders, and the like. Extension arm 60 may be clamped onto support member 14a using a fastener 62, and preferably a hollow tubular section opposite fastener 62, which is designed to receive an adaptor 70 therein. Fastener 62 may be any suitable fastener, such as a collet, threaded eye hook and bolt, and the like.

While this disclosure has been particularly shown and described with references to preferred embodiments thereof, it will be understood by those skilled in the art that various changes in form and details may be made therein without departing from the spirit and scope of the disclosure as defined by the appended claims.

What is claimed is:

1. A support system for suspending a bird feeder, comprising:
    a first support member having an upper end and a lower end, a second support member having an upper end and a lower end, the upper end of the first support member being constructed and arranged to support the second support member;
    a clamping assembly disposed at the lower end of the first support member, the clamping assembly including an upper clamp member and a lower clamp member, each of the upper and lower clamp members being adjustably and independently spaced apart and further including corresponding apertures for receiving the first support member therein, both of the upper and lower clamp members further including a pair of spaced apart adjustable jaws positioned about the first support member for adjusting the tension on the first support member such that the first support member is moveable within the apertures from a first position to a second position;
    each pair of jaws defining an adjustable gap therebetween;
    a fastening mechanism for each pair of jaws and that connects between the pair of jaws across the gap and for securing the jaws in place about the first support member;
    said clamping assembly being constructed and arranged to be disposed on opposite sides of a support rail from which the clamping assembly is to be held;

said upper and lower clamp members each having facing clamping surfaces for positioning at respective opposite sides of said support rail;

and further including a tensioning device carried by one of said upper and lower clamp members at said facing surface;

said tensioning device being adjustable relative to the clamp member by which it is carried and including a handle end and an opposite gripping end having a bearing surface that directly contacts one side of said support rail;

the facing clamping surface of the other one of said upper and lower clamping members directly contacting an opposite side of said support rail.

2. The support system of claim 1, wherein at least the lower end of the second support member includes a hollow portion having an internal diameter, the hollow portion being sized and dimensioned to receive at least a portion of the upper end of the first support member therein.

3. The support system of claim 2, wherein the upper end of the first support member has an external diameter that is smaller than the internal diameter of the second support member, the upper end of the first support member being sized and dimensioned to be slidably received into and engaged with the lower end of the second support member.

4. The support system of claim 1, wherein each fastening mechanism comprises a fastening screw member that extends between respective passages in the jaws.

5. The support system of claim 1, wherein the upper and lower ends of the first support member have an external diameter, the external diameter of the upper end being smaller than the external diameter of the lower end.

6. A support system for suspending a bird feeder, comprising:

a first support member having an upper end and a lower end, a second support member having an upper end and a lower end, the upper end of the first support member being constructed and arranged to support the second support member;

a clamping assembly disposed at the lower end of the first support member, the clamping assembly including an upper clamp member and a lower clamp member, each of the upper and lower clamp members being adjustably spaced apart and further including corresponding apertures for receiving the first support member therein, each of the upper and lower clamp members further including a pair of spaced apart adjustable jaws for adjusting the tension on the first support member such that the first support member is moveable within the apertures front a first position to a second position;

said clamping assembly being constructed and arranged to be disposed on opposite sides of a support rail from which the clamping assembly is to be held;

said upper and lower clamp members each having facing clamping surfaces for positioning at respective opposite sides of said support rail;

and further including a tensioning device carried by one of said upper and lower clamp members at said facing surface;

said tensioning device being adjustable relative to the clamp member by which it is carried and including a handle end and an opposite gripping end having a bearing surface that directly contacts one side of said support rail;

the facing clamping surface of the other one of said upper and lower clamping members directly contacting an opposite side of said support rail;

and a securing knob disposed at the lower end of the second support member for alignment with an unthreaded surface of the first support member.

7. The support member of claim 1, wherein the tensioning device includes a threaded eye hook.

8. The support system of claim 1, wherein the gap between the jaws is disposed at a side of the first support member that is displaced by 180 degrees from the facing clamping surfaces.

9. The support system of claim 1, wherein the upper and lower clamp members include inner and outer surfaces, at least one of the inner surfaces being a gripping surface.

10. The support system of claim 1, wherein the first support member is vertically moveable within the apertures of the upper and lower clamp members.

11. The support system of claim 10, wherein the first support member is rotatably moveable within the apertures of the upper and lower clamp members.

12. The support system of claim 1, wherein the tension device is carried by only one of said upper and lower clamp members.

13. The support system of claim 1, wherein said adjustable jaws are disposed on one side of the aperture and the clamping surfaces are disposed on the opposite side of the aperture.

14. The support system of claim 1, wherein said tensioning device includes a threaded shaft and a support disc with the threaded shaft extending through the clamp member at said clamping surface.

15. The support system of claim 1 wherein the upper and lower clamp members are adjustable in the direction of a longitudinal axis of the first support member so as to vary the spacing between the upper and lower clamp members so as to accommodate rails of differing thickness.

16. The support system of claim 1 wherein the fastening mechanism include elongated fastening members and the tensioning device includes an elongated shaft member, the elongated fastening member extending substantially orthogonal to the elongated shaft member.

17. A support system for suspending a bird feeder, comprising:

at least a first support member having an upper end and a lower end;

a clamping assembly disposed at an end of the first support member, the clamping assembly including an upper clamp member and a lower clamp member, each of the upper and lower clamp members being adjustably and independently spaced apart and further including corresponding apertures for receiving the first support member therein, both of the upper and lower clamp members further including a pair of spaced apart adjustable jaws positioned about the first support member for adjusting the tension on the first support member such that the first support member is moveable within the apertures;

said clamping assembly being constructed and arranged to be disposed on opposite sides of a support rail from which the clamping assembly is to be held;

said upper and lower clamp members each having facing clamping surfaces for positioning at respective opposite sides of said support rail;

said upper and lower clamp members supported without any rigid connection therebetween so that the relative position therebetween can be adjusted so as to vary the spacing between the upper and lower clamp members so as to accommodate support rails of differing thickness;

and further including a tensioning device carried by one of said upper and lower clamp members at said facing surface;

the facing clamping surface of the other one of said upper and lower clamping members directly contacting an opposite side of said support rail.

18. The support system of claim 17 wherein said tensioning device is adjustable relative to the clamp member by which it is carried and including a handle end and an opposite gripping end having a bearing surface that directly contacts one side of said support rail.

19. The support system of claim 17 wherein each pair of jaws defines an adjustable gap therebetween and a fastening mechanism for each pair of jaws and that connects between the pair of jaws across the gap and for securing the jaws in place about the first support member.

20. The support system of claim 19 wherein the fastening mechanism include elongated fastening members and the tensioning device includes an elongated shaft member, the elongated fastening member extending substantially orthogonal to the elongated shaft member.

21. The support system of claim 17 wherein the jaws each have locked and unlocked states and in the unlocked state at least one of the jaws is free to slide along the first support member to adjust the relative position between the upper and lower clamp members.

22. The support system of claim 17 including a second support member having an upper end and a lower end, the upper end of the first support member being constructed and arranged to support the second support member.

* * * * *